July 30, 1963     G. C. MAYFIELD     3,099,455
PISTON RING ASSEMBLY
Filed Sept. 19, 1960     2 Sheets-Sheet 1
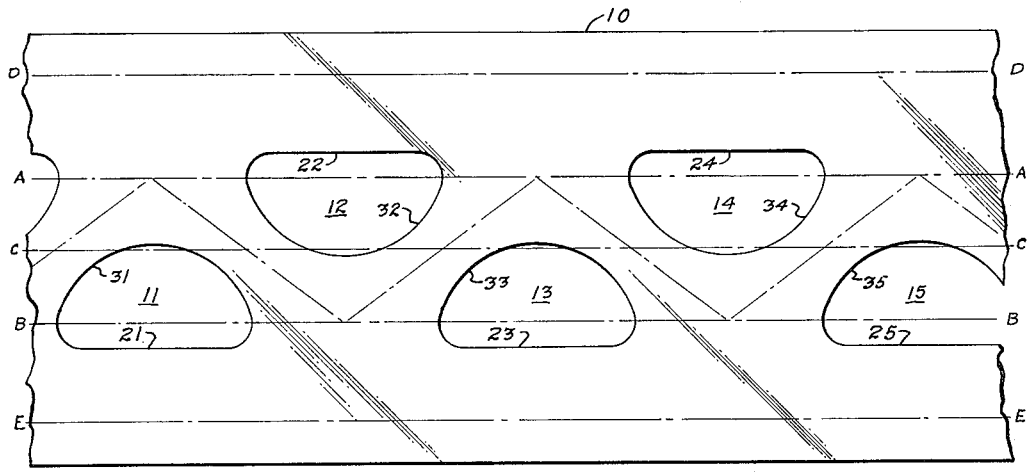
FIG. 1.
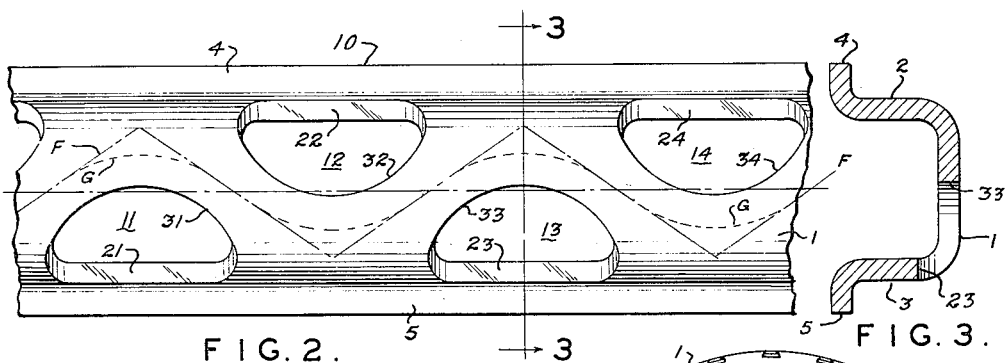
FIG. 2.     FIG. 3.
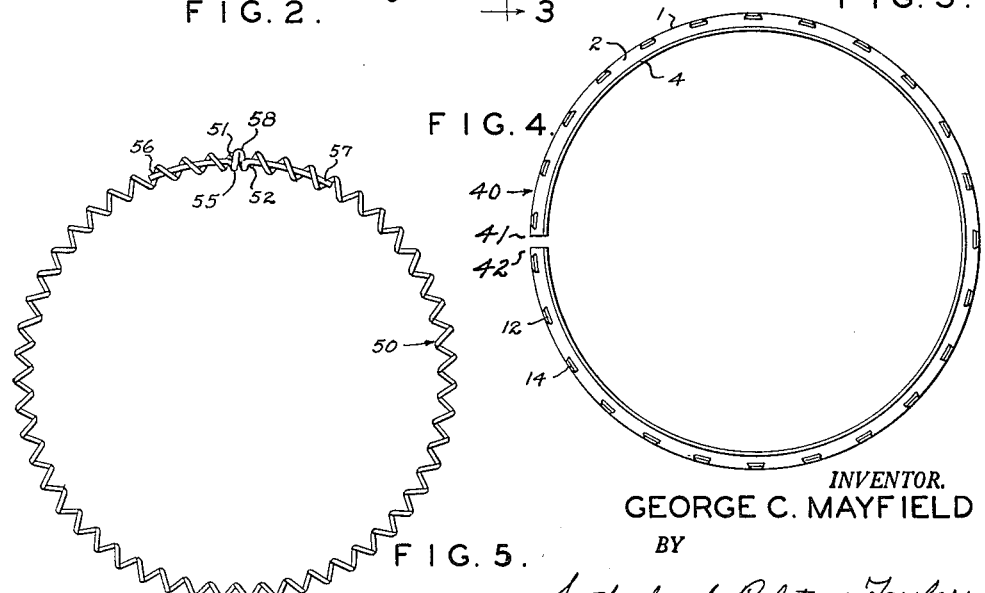
FIG. 4.
FIG. 5.
INVENTOR.
GEORGE C. MAYFIELD
BY
Sutherland, Polster & Taylor
ATTORNEYS July 30, 1963 G. C. MAYFIELD 3,099,455
PISTON RING ASSEMBLY
Filed Sept. 19, 1960 2 Sheets-Sheet 2

INVENTOR.
GEORGE C. MAYFIELD
BY
Sutherland, Polster & Taylor
ATTORNEYS

# United States Patent Office 3,099,455
Patented July 30, 1963

3,099,455
PISTON RING ASSEMBLY
George C. Mayfield, Richmond Heights, Mo., assignor to McQuay-Norris Manufacturing Company, St. Louis, Mo., a corporation of Delaware
Filed Sept. 19, 1960, Ser. No. 57,040
2 Claims. (Cl. 277—163)

This invention relates to multi-piece piston ring assemblies and more specifically to the type of piston ring assembly in which split piston rings or rails are supported in axially spaced relation in a piston ring groove by a split backing ring or spacer ring and in which a radial control force is applied to the piston rings or rails by an annular coil spring held compressed inside the backing ring or spacer ring. Such a piston ring assembly is shown in my co-pending application for "Piston Ring Assemblies" Serial No. 56,223, filed September 15, 1960, now Patent No. 3,080,172, our docket No. 277. The instant invention disclosed in this application is directed specifically to a backing ring construction which is distinctly different in operation and result. The piston ring assembly, hereinafter described in detail, is primarily intended for use as an oil control ring on a piston for an internal combustion piston engine, but, of course, the assembly described is merely exemplary, and it is contemplated that the assembly may include rings designed for other purposes.

According to this invention, this piston ring assembly is full-floating and non-bottoming in the piston ring groove and includes split expansible and contractible piston ring elements of suitable design supported in the ring groove of the piston in spaced relation by a novel form of backing ring or spacer ring element. This backing ring or spacer ring element is split to permit expansion and limited contraction. The backing ring element is an annular strip of spring metal with a channel shaped cross-section providing a cylindrical wall or web and annular diametrically inwardly directed flanges or legs at opposite edges of the cylindrical wall. At the inner periphery of each annular flange or leg are upstanding rims extending oppositely and outwardly of the backing ring to engage the inner periphery of the piston rings when supported between the outer surface of the annular flanges or legs and the inner radial face of the piston ring groove. A radially outwardly directed resilient force is applied to the cylindrical wall of the backing ring by a plain round coil spring with a pre-selected free length formed into an annulus by means holding the opposite ends of the coil spring in abutting relation. In accordance with usual practice, the free length of the annular coil spring is greater than the inner circumference of the cylindrical wall of the backing ring when this ring is in operating relationship with the piston ring engaging a cylinder wall, and, consequently, the annular coil spring is compressed circumferentially so that it exerts a continuous expansive force radially outwardly on the cylindrical inner wall of the backing ring, which force is uniform around the inner periphery of the cylindrical wall of the backing ring. Like radially outwardly directed forces are transposed from the backing ring to the piston ring through the upstanding rims.

As set forth in my prior application above referred to, it is desirable to obtain a circumferentially uniformly distributed expansive force acting on the piston ring from the annular coil spring. This result may be obtained by a ring assembly, which acts as a whole, and a backing ring in particular which has sufficient flexibility to accommodate the very small variations in cylinder wall contour from true cylindrical shape. In addition, sliding friction between the ring elements in the ring assembly must be held to a minimum especially at the bearing surfaces between the cylindrical wall of the backing ring and the annular coil spring. In my prior application, the first requirement, flexibility, is obtained in a similar manner as in the ring shown in my prior Patent 2,486,359 of October 25, 1949, and friction is minimized by inclining the slots in the cylindrical wall with respect to the axis of the backing ring in a direction opposite to the lay of the wire in the coils at the bearing surfaces between the cylindrical wall of the backing ring and the coil.

There are applications for piston ring assemblies in which greater and more uniform beam strength is required in the channel shaped backing ring than can be provided by any change in spacing or width of the slots in a slotted ring. The instant invention provides this characteristic while maintaining the desirable characteristic of uniform circumferential flexibility provided by the slotted ring. Thus, according to this invention, semi-elliptical apertures are formed alternately in opposite edges of the backing ring and extend from within the flanges or leg portions to within the cylindrical wall or web portion. In other words, the straight edge of the semi-elliptical aperture is located in the flange, and the curved edge extends either to or slightly beyond the middle of the cylindrical wall or web. The alternate locations of these spaced apertures, extending as they do from opposite edges of the ring, leave a sinuous strip of substantially uniform cross-section forming the cylindrical wall or web, or what might be considered as diagonal web members in the cylindrical wall, alternately inclined in opposite directions in a truss-like manner. These truss-like members or webs are interconnected between the edges of the cylindrical wall. Since the apertures extend across the corner bends of the channel between the flange and the cylindrical wall thereof, the rigidity of the backing ring to circumferential flexibility inherent in the angular relation of the channel is avoided. The backing ring becomes flexible, but maintains its beam strength due to the truss-like formation in the cylindrical wall.

The second requirement, minimum sliding friction, especially at the bearing surfaces between the backing ring and the annular coil spring is obtained in much the same way as disclosed in my prior application above identified. In other words, coil diameter in the annular spring is such that the spring can roll on the cylindrical wall of the backing ring and is definitely not confined against axial movement between the flanges. The truss-like interconnected webs forming the cylindrical wall, which are formed by the alternate arrangement of semi-elliptical apertures, have edges on one side which are inclined in a direction opposite to the lay of the wire in the coils of the coil spring at the bearing surfaces between the cylindrical wall of the backing ring and the coil spring. Opposite edges of these webs have a greater inclination in the same direction as the lay of the coils at the bearing surface between the cylindrical wall of the backing ring and the coil spring. This construction eliminates interference between the coils of the spring and the edges of the truss-like web. It might be added, however, that the wire size chosen for the coil spring is relatively large with respect to the coil size, thus, providing for substantial circumferential rigidity. Together, these features contribute to obtaining minimum friction between coil spring and cylindrical wall during relative circumferential movement of one with respect to the other and maximum uniformity of the control pressure over the surface of the cylindrical wall. The coil spring is permitted to float between the flanges of the backing ring and seek a path of minimum frictional contact therewith.

It is an object of this invention to provide a piston ring assembly in which radially directed forces are uniform between the piston rings and the cylinder walls.

It is another object of this invention to provide a backing ring in a piston ring assembly which has uniform flexibility and substantial beam strength.

It is still another object of this invention to provide a backing ring in a piston ring assembly which has high beam strength and yet uniform circumferential flexibility in a radial direction.

It is still another object of this invention to provide a backing ring in a piston ring assembly which has a discontinuous cylindrical wall confining a coil expansion spring.

It is still another object of this invention to provide in the organization above described broadly the maximum of flexibility with beam strength and the minimum of friction and interference between spring and backing ring.

Further objects and advantages of this invention will appear from the following which is a full, clear and exact description of the invention when taken with the accompanying drawings forming a part thereof and in which:

FIG. 1 is a plan view of a punched spring strip of metal from which one of the ring elements of the piston ring assembly is formed;

FIG. 2 and FIG. 3 are elevational and cross-sectional views of the strip shown in FIG. 1 after it has been formed into a channel suitable for a backing ring;

FIG. 4 is a top plan view of a backing ring formed from the channel shown in FIGS. 2 and 3;

FIG. 5 is a top plan view of an annular coil compression spring used as an expander for the backing ring shown in FIG. 4;

Figure 6:
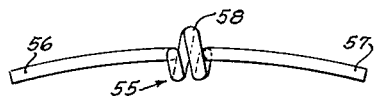
FIG. 6 is an enlarged detailed view of the connector for the ends of the coil spring shown in FIG. 5.

The following is a detailed description of the construction shown in the several views of the drawings. The manner in which the construction shown therein is described does not necessarily correspond with the method of manufacture, but is chosen here merely for the purposes of convenience to facilitate an explanation of the invention. The strip of spring steel 10, shown in FIG. 1, is chosen of proper width to form the complete channel member for the backing ring in this piston ring assembly, and the phantom lines A—A and B—B, shown in FIG. 1, illustrate the future location of the corner bends to form the channel. These are placed on FIG. 1 to indicate the location of the apertures 11, 12, 13, 14, etc., which are punched in the spring strip 10. Likewise, the phantom line C—C indicates the center between the lines A—A and B—B and also indicates the depth to which the apertures 11, 12, 13, 14 and 15 extend into what will be the cylindrical wall of the backing ring. Phantom lines D—D and E—E indicate the location of the corner bend in the strip which will form the upstanding rim on the channel. Each of the apertures 11 through 15, etc., have straight edges 21 through 25, inclusive, which are displaced outwardly of the lines A—A and B—B from the center of the strip. These straight edges 21, 23, 25 will be located in the lower flange of the channel between the lines B—B and E—E while the straight edges 22, 24, etc., will be located in the upper flange of the channel since they are between the lines A—A and B—B. Each of the apertures 11 through 15 punched into the strip 10 also have semi-elliptical shaped edges extending toward the center of the strip 10 and indicated as 31 through 35, inclusive.

Referring now to FIGS. 2 and 3, the strip 10 with the apertures so formed is rolled into a channel section. The channel will have a wall or web portion 1 and upper and lower flanges 2 and 3 which have formed at their ends the rims 4 and 5. As will be apparent from an inspection of these figures, the apertures 11–15, inclusive, are now located so that the straight edges thereof, 21 through 25, are located in the flanges 2 and 3, whereas the elliptical edges 31 through 35 are located in the wall 1. Since the apertures 11 through 15, inclusive, extend across the corners of the channel, indicated by the lines B—B and E—E of FIG. 1, the inherent rigidity which would be imparted by the corner bends to the flange strip 10 is avoided, and the strip 10 becomes flexible longitudinally. The apertures 11 through 15, inclusive, etc., located as they are alternately at the upper and lower edges of the wall 1 of the strip 10 form, as it were, a plurality of inclined struts for a truss-like structure. To illustrate an understanding, the phantom lines F—F have been drawn on FIG. 2 which indicate the center line of each strut in the truss-like structure of the cylindrical wall 1. Also indicated in FIG. 2 is a mean cross-section of the strip of material forming the cylindrical wall 1. This is represented by the sinuous curved phantom line G—G which is drawn through the points of mean cross-section. The apertures 11 through 15, inclusive, etc., along the strip are so arranged and proportioned that the widthwise distance indicated by the sinuous curved phantom line G—G is substantially the same along the length of the strip 10. This peculiar arrangement, proportioning and orientation of the apertures 11 through 15, etc., inclusive, produces a strip of metal between the flanges 2 and 3 in the wall 1 which will be of uniform strength and springiness in the plane of bending parallel with the flanges 2 and 3. On the other hand, the channel 10 will retain its beam strength and its resistance to distortion in planes parallel with the web portion 1. In the latter respect, it differs from all prior art constructions.

The strip 10 which has been formed into a channel is then rolled, or otherwise formed into rings 40, such as shown in FIG. 4, with spaced ends 41 and 42. This forming operation makes an annular ring from the strip 10, which ring has its cylindrical wall 1 disposed at its outer periphery and the flanges 2 and 3 projecting radially inwardly therefrom. Rims 4 and 5 will then project axially of the ring 40.

This ring 40 is adapted to contain a coil compression spring 50, such as shown in FIG. 5. The coil spring 50 is of relatively conventional construction formed of spaced helical coils of spring wire. The ratio of wire size relative to coil size is chosen to be relatively large for reasons which will appear hereinafter. Opposite ends 51 and 52 of the coil spring 50 are held in abutting relation by a connector 55, as in FIG. 6. Each end 56 and 57 of the connector 55 is preferably curved so as to telescope within the coils of the coil spring 50. The center portion 58 is formed into a helical loop and acts as an abutment between the ends 51 and 52 of the coil spring 50.

Figure 7:
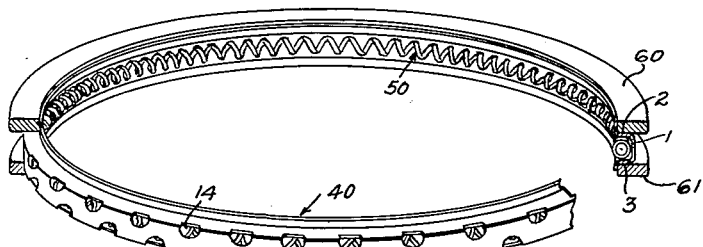
FIG. 7 is a perspective view of a piston ring assembly formed from the parts shown in FIGS. 2 through 6, inclusive.

FIG. 7 illustrates the operative relationship between all of the parts of the piston ring assembly. In this view, the upper and lower flanges 2 and 3 of the backing ring 40 act as supports and spacers for a pair of split annular rails 60 and 61, the outer peripheries of which bear against the cylinder wall. The pressure urging the rails 60, 61 against the cylinder wall is controlled by the circumferentially compressible coil spring 50 located to bear against the cylindrical wall 1 of the backing ring. Sufficient clearance exists between the inside of flanges 2 and 3 and the outside of coil spring 50 to allow the spring 50 to float and find its own seat on the cylindrical wall 1. Attention is specifically directed to the aperture 14 in the backing ring 40 which exposes a view of the operating side of the coil spring 50 against the surface of the cylindrical wall 1. From this view, it will be observed that the edges of the aperture do not interfere with relative circumferential movement between the coil spring 50 at the surface of the cylindrical wall 1. This is due to the fact that the edges of the aperture are either inclined opposite to the direction of the lay of the coils of the spring 50 or at an angle greater than the lay of the coils of the spring 50. In either case, the coils of the spring can readily slide over the edges of the aperture without interference. The same result could be obtained by having the edges of the apertures inclined at an angle slightly less than the angle of lay of the coils of the spring 50. As long as the edges of the apertures, such as 31–35, inclusive, are curved, obviously, one or the other condition will prevail, more likely the former than the latter, because the center line of the coil spring 50 and, thus, the line of contact cannot move outwardly as far as the flanges 2 and 3.

Figure 8:
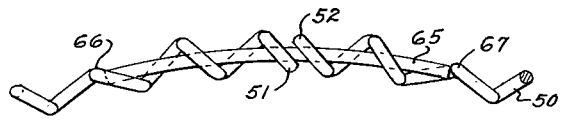

Turning now to FIG. 8, there is shown a different form of connector from that shown in FIG. 6. This form of connector is a curved rod 65 of a diameter to slidably fit within the ends of the coil springs 51 and 52 and hold them in abutting relation. At either end of the rod 65, the coils of the coil spring 50, arbitrarily indicated as 66 and 67, are deformed from a circular contour of the spring so as to lie in abutting relation with the ends of the rod 65 preventing it from shifting in either direction and migrating out of position.

Figure 9:
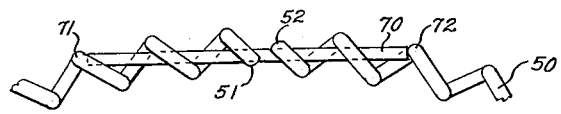

The modification of connector 70, shown in FIG. 9, operates in substantially the same way as that of FIG. 8. Rod 70 is of a diameter to slide within the opposite ends of the coil spring 50 so as to hold the ends 51 and 52 in abutting relation. Since the spring is annular and the rod is straight, the ends of the rod will abut certain of the coils, such as 71 and 72, preventing the rod 70 from migrating out of position so as to allow the ends of the spring 50 to overlap.

Figure 10:
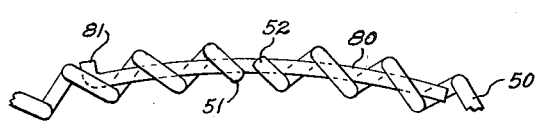

The modification, shown in FIG. 10, is a curved rod 80, one end of which 81 is bent at an angle to fit between the coils of the spring 50. Rod 80 will hold the ends 51 and 52 in abutting relation and is prevented from migrating out of position by the angular end 81 projecting between the coils. The fact that the rod 80 is curved will prevent it from rotating, and thereby unscrewing itself from its proper position.

Figure 11:
FIGS. 8 through 13 are enlarged detailed views illustrating different forms of connectors for the end of a coil spring which may be used in place or substitution for the connectors shown in FIG. 6.
Figure 12:
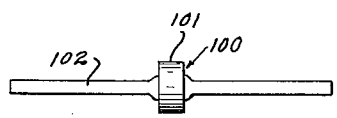
Figure 13:
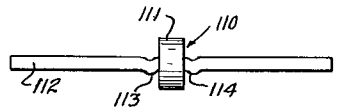

The modifications, shown in FIG. 11 to FIG. 13, inclusive, are similar to that shown in FIG. 6. The rod 90 has an intermediate loop 91 and opposite straight ends 92 and 93 which can project into the opposite ends of the coil spring. The loop 91 prevents the rod 90 from migrating out of position during operation of the piston ring assembly.

The connector 100, shown in FIG. 12, has a washer 101 staked in place on the straight wire 102 so as to fix the position of the washer 101. This modification operates the same as that in FIGS. 6 and 11.

In FIG. 13, the connector 110 has a washer 111 fixed in place intermediate the length of the rod 112 by offsetting loops 113 and 114 on either side of the washer 111. This is an alternative way of forming the modification shown in FIG. 12.

*Operation*

In a piston ring assembly, as constructed according to the above description, the coil spring 50 is selected of proper length so that it will be compressed within the backing ring 40 when the piston ring assembly is in operative condition. The spring will then exert a continuous radial force outwardly against the cylindrical wall 1 of the backing ring, and this radial force in turn will be transmitted to the rails 60 and 61 through the rims 4 and 5, respectively. Any irregularities or departures in the surface of the cylinder wall from true cylindrical shape will in part be compensated by the ability of the backing ring 40 to flex circumferentially thereby moving outwardly or inwardly, as the case may be, to allow the rails 60, 61 to move in or force them out and keep the force applied to the cylinder wall by the ring substantially uniform. During this flexing action of the backing ring, coil spring 50 will compress or expand circumferentially sliding over the cylindrical wall surface 1 of the backing ring 40. Changes in diameter of the cylinder are compensated for by this expansion and contraction, as the case may be, coil spring 50 compressing or expanding circumferentially to compensate for the changes in diameter of the backing ring and the rails 60, 51. The fact that the coil spring 50 has freedom of movement between the annular radial flanges 2 and 3 minimizes any sliding friction at the bearing surfaces between the cylindrical wall 1 of the backing ring and the outer periphery of the annular coil spring 50 at the bearing surfaces between the coil spring and the backing ring. If there is any resistance to the expansion and contraction of the coil spring 50, the coil spring 50 is free to move along the cylindrical wall 1 to avoid the resistance and thereby maintain a uniform radial force on the backing ring 40.

While the backing ring 40 is radially flexible under the influence of the coil spring 50, it has, nevertheless, the beam strength to resist axial flexing under the load which may be imposed thereon by the friction between the rails 60, 61 and the cylinder wall. The truss-like structure of the cylindrical wall 1 forms a circumferentially extending vertical girder in the annular ring 40 contributing the necessary strength to carry the load of the rails 60, 61 without noticeable deflection whereby the rails 60, 61 are maintained against the radial face of the piston ring groove.

Figure 14:
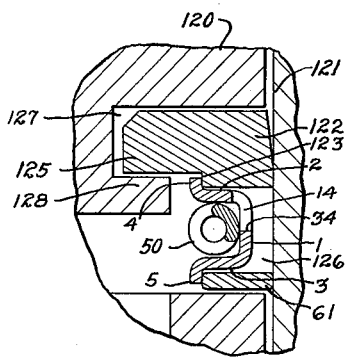
FIG. 14 is a transverse section through a portion of a piston, cylinder wall and piston ring on an enlarged scale illustrating the use of the backing ring in a different ring assembly.

In the modified form of the invention illustrated in FIG. 14, a piston ring assembly is shown utilizing the same backing ring, as heretofore described, and coil spring expander ring 50. Flange 3 of the backing ring supports the rail 61 similar to that shown in FIG. 7, but the upper flange 2 of the backing ring supports a compression ring 122. Both piston rings are supported in a piston ring groove 126 in the piston 120, which piston ring groove is divided by a bridge portion 128 accommodating a section 125 of the compression ring 122 of reduced width. This leaves an annular shoulder 123 in the lower surface of the compression ring 122 which is engaged by the upstanding rim 4 of the backing ring.

In operation, the pressure of the coil spring 50 is transmitted directly to the web 1 of the backing ring and from the backing ring through the upstanding rims 4 and 5 to the oil control ring 61, which is a rail. Rim 4 engages the annular shoulder 123 of the piston ring 122 in a like manner so that the backing ring transmits the force of the coil spring 50 to both rings 61 and 122 urging them outwardly against the cylinder wall 121. Since the backing ring has little torsional rigidity, the two rings 61 and 122 may move relative to each other in a radial direction without any substantial change in the control force applied by the coil spring 50 to either of these rings. The modifications shown in FIGS. 7 and 14, respectfully, are included for the purpose of illustrating how this type of backing ring and coil spring control may be applied to rings to different types for different purposes.

Changes in and modifications of the construction described may be made without departing from the spirit of my invention or sacrificing its advantages.

Having thus described the invention, what is claimed and desired to be secured by Letters Patent is:

1. In a piston ring assembly, an expansible and contractible piston ring element comprising, an annular strip of spring metal having in part a generally channel cross-section forming a ring element with cylindrical wall portions and integral annular flanges, said cylindrical wall portions comprising a web portion defining a sinuous strip of metal of substantially constant cross-section and including a series of spaced apertures adjacent each flange, the edges of the apertures in one series overhanging the edges of apertures in the other series to define a plurality of oppositely inclined spaced webs, the respective webs extending beyond the adjacent apertures whereby to provide a truss-like structure of uniform beam strength in one direction and of uniform flexibility in another direction.

2. The piston ring assembly of claim 1 wherein the annular flanges are directed radially inwardly with respect to said piston ring element, and an annular round compression spring in rolling contact with said cylindrical wall portions and arranged to exert a radially outwardly directed force at intermediate portions of said spaced webs.

References Cited in the file of this patent

UNITED STATES PATENTS

| | | |
|---|---|---|
| 2,220,947 | Paton | Nov. 12, 1940 |
| 2,290,499 | Smith | July 21, 1942 |
| 2,713,527 | Hsia-Si Pien | July 19, 1955 |
| 2,722,467 | Olson | Nov. 1, 1955 |
| 2,779,647 | Hamm | Jan. 29, 1957 |
| 2,917,353 | Baumler | Dec. 15, 1959 |